United States Patent
Jouin et al.

(10) Patent No.: US 9,063,734 B2
(45) Date of Patent: *Jun. 23, 2015

(54) MICROCONTROLLER INPUT/OUTPUT CONNECTOR STATE RETENTION IN LOW-POWER MODES

(75) Inventors: Sebastien Jouin, La Chapelle-Launay (FR); Romain Oddoart, Petit-Mars (FR); Patrice Menard, Saint-Mars-du-Desert (FR); Mickael Le Dily, Carquefou (FR); Thierry Gourbilleau, Le Loroux-Bottereau (FR)

(73) Assignee: Atmel Corporation, San Jose, CA (US)

( * ) Notice: Subject to any disclaimer, the term of this patent is extended or adjusted under 35 U.S.C. 154(b) by 301 days.

This patent is subject to a terminal disclaimer.

(21) Appl. No.: 13/606,515

(22) Filed: Sep. 7, 2012

(65) Prior Publication Data

US 2014/0075231 A1    Mar. 13, 2014

(51) Int. Cl.
*G06F 1/00* (2006.01)
*G06F 1/32* (2006.01)

(52) U.S. Cl.
CPC ........... *G06F 1/3243* (2013.01); *Y02B 60/1239* (2013.01)

(58) Field of Classification Search
CPC .................................................... G06F 1/3203
USPC ........................................................ 713/324
See application file for complete search history.

(56) References Cited

U.S. PATENT DOCUMENTS

| 6,557,107 | B1 * | 4/2003 | Kim | 713/320 |
|---|---|---|---|---|
| 6,665,802 | B1 * | 12/2003 | Ober | 713/320 |
| 7,091,348 | B2 * | 8/2006 | O'Neill et al. | 544/280 |
| 7,908,500 | B2 * | 3/2011 | Westwick et al. | 713/323 |
| 8,010,819 | B2 * | 8/2011 | Pastorello et al. | 713/323 |
| 2014/0075066 | A1 * | 3/2014 | Menard et al. | 710/104 |

OTHER PUBLICATIONS

Atmel Corp, "8-bit Atmel Microcontroller with 128Kbytes In-System Programmable Flash," ATmega128, ATmega128L, 386 pages (Jun. 2011).

* cited by examiner

*Primary Examiner* — Suresh Suryawanshi
(74) *Attorney, Agent, or Firm* — Fish & Richardson P.C.

(57) ABSTRACT

A microcontroller is operable in a low-power mode and includes one or more I/O connectors, as well as an I/O controller operable to provide control signals for controlling a state of a particular one of the I/O connectors. The I/O controller is powered off or deactivated during the low-power mode. The microcontroller also includes I/O connector state control logic operable to control the state of the particular one of the I/O connectors in accordance with the control signals from the I/O controller. The I/O connector state control logic includes I/O connector state retention logic that retains states of the control signals and maintains the particular I/O connector in a corresponding state in accordance with the retained control signals while the microcontroller is in the low-power mode.

20 Claims, 4 Drawing Sheets

MICROCONTROLLER INPUT/OUTPUT CONNECTOR STATE RETENTION IN LOW-POWER MODES

FIELD OF THE DISCLOSURE

This disclosure relates to retention of the state of microcontroller input/output (I/O) connectors, such as I/O pads and I/O pins, in low-power modes of operation.

BACKGROUND

Microcontrollers sometimes can operate in various modes, including power savings modes that allow overall power consumption to be reduced. In such low-power consumption modes, power typically is not supplied to some of the modules or components of the microcontroller. However, when the microcontroller enters such a power savings mode, I/O connectors (e.g., I/O pads or pins) for the microcontroller may be in an uncontrolled stated, which can cause undesired complications for other modules or components of the microprocessor, as well as peripheral components that are coupled to the I/O connectors.

SUMMARY

This disclosure describes retention of the state of microcontroller I/O connectors in a low-power mode of operation.

For example, in one aspect, a microcontroller is operable in a low-power mode and includes one or more I/O connectors, as well as an I/O controller operable to provide control signals for controlling a state of a particular one of the I/O connectors. The I/O controller is powered off or deactivated during the low-power mode. The microcontroller also includes I/O connector state control logic operable to control the state of the particular one of the I/O connectors in accordance with the control signals from the I/O controller. The I/O connector state control logic includes I/O connector state retention logic that retains states of the control signals and maintains the particular I/O connector in a corresponding state in accordance with the retained control signals while the microcontroller is in the low-power mode.

Some implementations include one or more of the following features. For example, the I/O connector state retention logic can include latches, each of which is operable to be enabled to latch a respective one of the control signals from the I/O controller. The microcontroller can include a power state manager that provides a signal to cause the latches to latch the respective control signals when the microprocessor enters the low-power mode. When the microprocessor exits the low-power mode, the power state manager releases the signal that caused the latches to latch the respective control signals.

In some implementations, the control signals from the I/O controller include one or more of: a first signal to drive a logical one or zero onto the particular I/O connector, a second signal to select whether the particular I/O connector is used as an input or an output, and a third signal that selects a drive strength setting.

According to another aspect, a microcontroller that is operable in a low-power mode includes one or more I/O connectors and an I/O controller operable to provide control signals for controlling a state of a particular one of the I/O connectors. The I/O controller is powered off or deactivated during the low-power mode. The microcontroller includes I/O connector state control logic operable to control the state of the particular one of the I/O connectors in accordance with the control signals from the I/O controller. The I/O connector state control logic includes I/O connector state retention logic that retains respective states of the control signals and maintains the particular I/O connector in a corresponding state in accordance with the retained control signals while the microcontroller is in the low-power mode, thereby executing an I/O connector state retention function. The microcontroller also includes a power state manager, as well as a user interface. Depending on a value stored, for example, in a register, the user interface can be used to facilitate either automated or user-controlled I/O connector state retention. Automated state retention of the I/O connectors can be handled by the power state manager.

In yet a further aspect, a method of retaining the state of an I/O connector of a microcontroller includes generating, from an I/O controller in the microcontroller, one or more control signals for controlling a state of the I/O connector. The method further includes causing the microcontroller to enter a low-power mode of operation, in which the I/O controller is powered off or deactivated, and storing information indicative of the respective states of the one or more control signals prior to the I/O controller becoming powered off or deactivated. The I/O connector is maintained in a corresponding state in accordance with the stored information while the microcontroller is in the low-power mode.

The techniques described in this disclosure can facilitate retention of the state of I/O pins, I/O pads and other I/O connectors, even when the microcontroller enters a low-power mode of operation, during which the I/O controller is powered off or deactivated.

Other aspects, features and advantages will be readily apparent from the following detailed description, the accompanying drawings and the claims.

DETAILED DESCRIPTION

Figure 1:
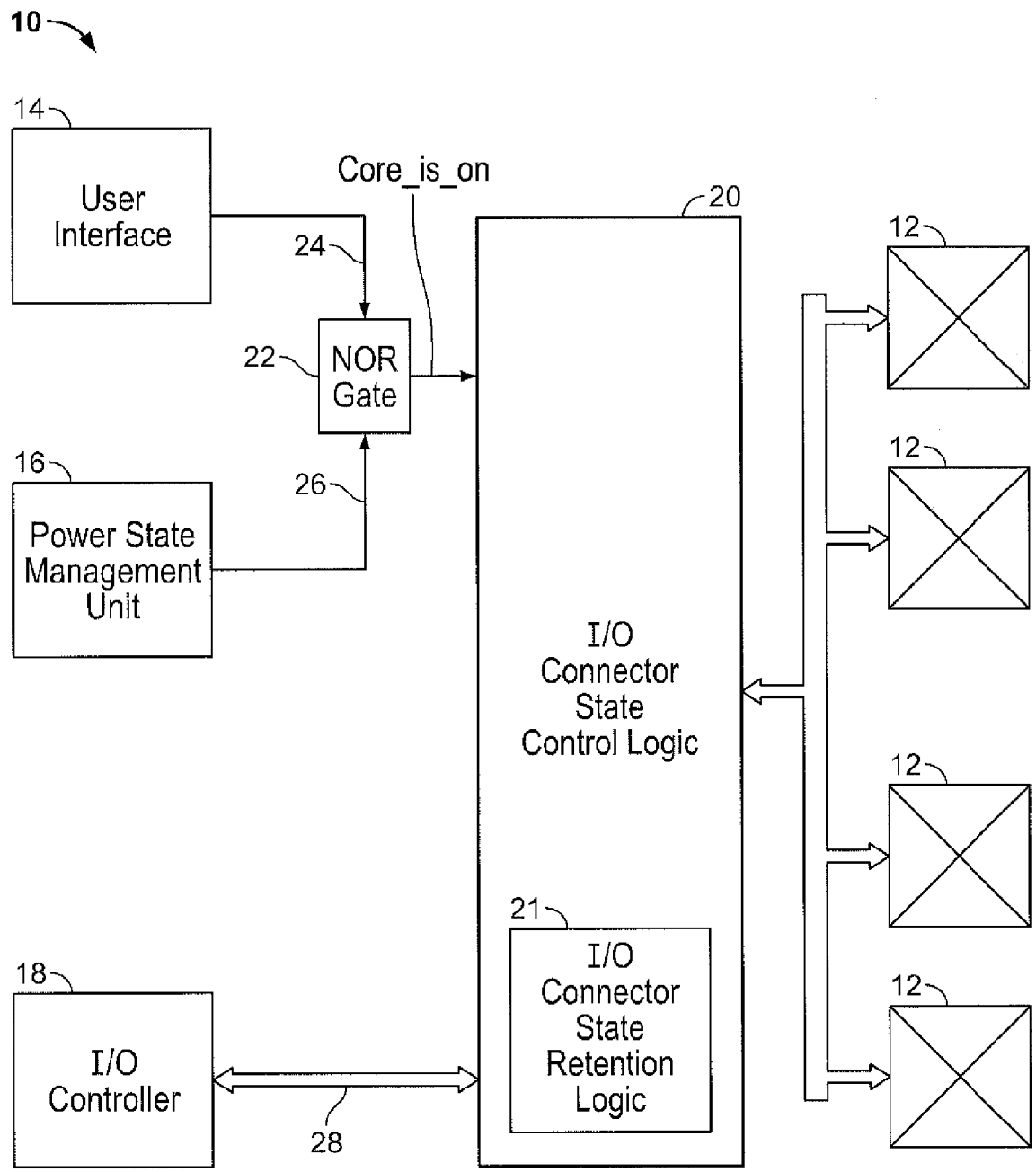
FIG. 1 is a block diagram showing features of a microcontroller according to some implementations of the invention.

As shown in FIG. 1, a microcontroller 10, which can be implemented, for example, as an integrated circuit chip, includes multiple input/output (I/O) metal pads 12 for the microcontroller socket. The I/O pads 12 or other I/O connectors serve as the interface for signals to and from the microcontroller chip. An I/O controller 18 can provide various control signals over lines 28 to I/O connector state control logic (i.e., circuitry) 20, which controls the state of I/O pads 12 in accordance with the control signals. Although FIG. 1 shows only four I/O pads, some implementations may include many more I/O connectors. Also, although the following discussion describes the I/O connectors as I/O pads, the I/O connectors may take other forms (e.g., I/O pins) as well. Microcontroller 10 also includes a user interface 14 to enable a user to configure various aspects of the microcontroller's operation.

As shown in FIG. 1, microcontroller 10 further includes a power state management unit 16 that controls in which of several modes the microprocessor operates. The operating modes can include an active mode as well as one or more low-power consumption modes. In some low-power consumption modes, power is not supplied to various modules, units, circuits, logic and peripherals. For example, I/O controller 18 and other core logic may be powered off or deactivated during some of the low-power modes of operation. Specified events that are monitored during a particular low-power mode can trigger microprocessor 10 to return, for example, to the active mode.

When microcontroller 10 enters a low-power consumption mode of operation in which many parts of the chip are deactivated or shutdown (i.e., without a power source), I/O pads 12 preferably should not remain in an uncontrolled stated. To address such a situation, microprocessor 10 includes I/O connector state control logic 20, which, in the illustrated example, facilitates both automated and user-controlled retention of the state of I/O pads 12 during power saving modes. The I/O connector state control logic 20 can be implemented, for example, in hardware logic. In the illustrated implementation, power state management unit 16 and I/O connector state control logic 20 are powered by an external power supply that may be dedicated, for example, to system I/Os. Thus, the foregoing logic remains active even if microprocessor 10 is operating in a power savings mode.

A signal from user interface 14 can be provided as a first input to a logical NOR gate 22 on line 24 and allows a user to select whether the I/O pad state retention function is to be performed by microprocessor 10 automatically or is to be user-controlled. Power state management unit 16 can provide another signal on line 26 which serves as a second input to NOR gate 22. As shown, for example, in FIG. 3, user interface 14 includes a pad retention enable register 40. If the value stored in register 40 is a logical zero ("0"), then upon microcontroller 10 entering a power saving mode, power state management unit 16 drives a logical one ("1") on line 26. In that case, the signal on line 26 causes an output ("Core_is_on") of NOR gate 22 to drop from a logical high to a logical low value. See FIG. 4. On the other hand, if the user writes a logical one ("1") to pad retention register 40 (see FIG. 5), the user gains control of the pad state retention function by effectively overriding the hardware automated control.

The "Core_is_on" output from NOR gate 22 is provided as an input to I/O connector state control logic 20. Prior to microprocessor 10 entering the low-power consumption mode (i.e., prior to I/O controller 18 powering off or becoming deactivated), I/O connector state control logic 20 also can receive various inputs (i.e., "Input data," Output enable" and "Drive strength control") from I/O controller 18. These other input signals, which are provided to I/O connector state control logic 20 over lines 28, are discussed in greater detail below. See FIG. 2. In addition, a signal ("Output data") can be provided from I/O connector state control logic 20 to I/O controller 18 over lines 28.

Figure 2:
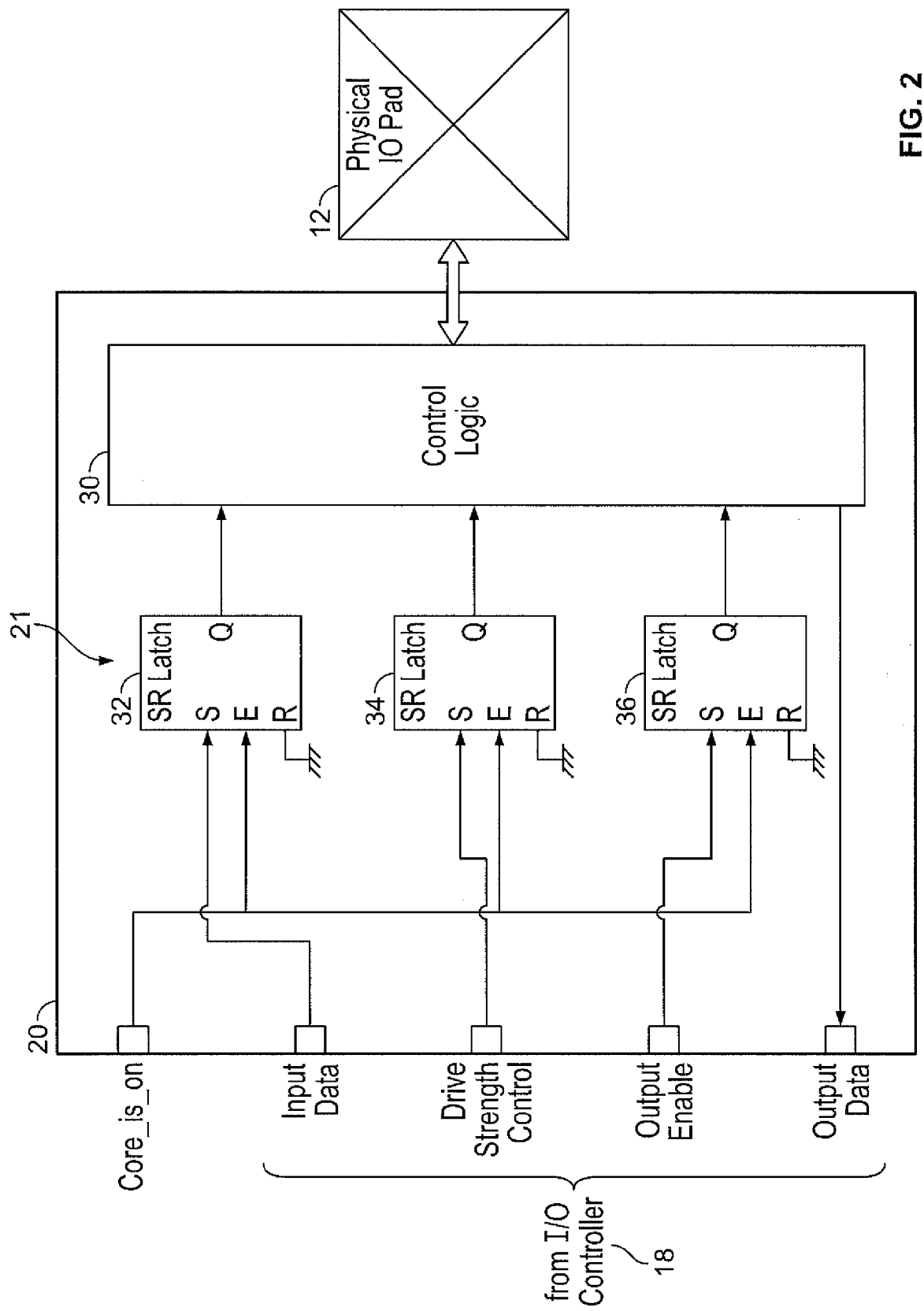
FIG. 2 illustrates various details of the pad state retention control logic according to some implementations.

Referring to FIG. 2, the "Input data" signal allows I/O controller 18 to drive a logical one ("1") or zero ("0") onto the physical I/O pad 12. The "output enable" input signal selects whether the I/O pad 12 is used as an input or an output and, in the latter case, enables an output buffer. The "drive strength control" input signal allows I/O controller 18 to choose between multiple drive strength settings (e.g., high drive (i.e., high output current) or low drive (i.e., low output current)). In addition, if the I/O pad 12 is enabled to receive input to microcontroller 10 rather than to send output, the "output data" line allows a logical one ("1") or zero ("0") to be driven by an external connection from the I/O pad 12 to I/O controller 18.

In FIG. 2, only a single I/O pad 12 is illustrated. Thus, only one set of lines for "Input data," Output enable," "Drive strength control" and "Output data" between I/O controller 18 and I/O connector state control logic 20 is illustrated. However, for each other I/O pad 12 whose state can be retained, there would provide a separate set of lines for "Input data," Output enable," "Drive strength control" and "Output data".

As shown in FIG. 2, I/O connector state control logic 20 includes I/O connector state retention logic 2, which can be implemented, for example, as SR latches 32, 34, 36. Latches 32, 34, 36 can be enabled so as to retain the values of the "Input data," Output enable" and "Drive strength control" signals even after microcontroller 10 enters a low-power mode. Each latch 32, 34, 36 receives a respective one of the foregoing signals at its S input and receives the "Core_is_on" signal from NOR gate 22 at its E input. The R input of each latch 32, 34, 36 is grounded.

A single "Core_is_on" input signal from NOR gate 22 can be used to drive all latches 32, 34, 36 for all I/O pads 12. In particular, all the input control signals (i.e., "Input data," Output enable" and "Drive strength control") are latched when the "Core_is_on" signal is a logical low value ("0"), and the states of the input signals are retained until the "Core_is_on" returns to a logical high value ("1"). As further shown in FIG. 2, control logic 30 serves as the interface to and from physical I/O pad(s) 12. Thus, for example, based on the "Input data," Output enable" and "Drive strength control" signals retained by latches 32, 34, 36, control logic 30 maintains the appropriate state for each corresponding I/O pad 12.

Figure 3:
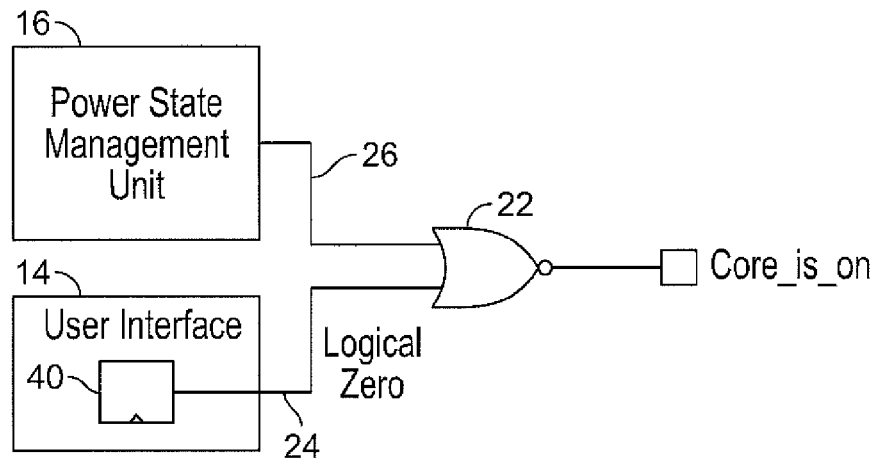
FIG. 3 illustrates portions of the logic for automated control of the pad state retention function.
Figure 4:
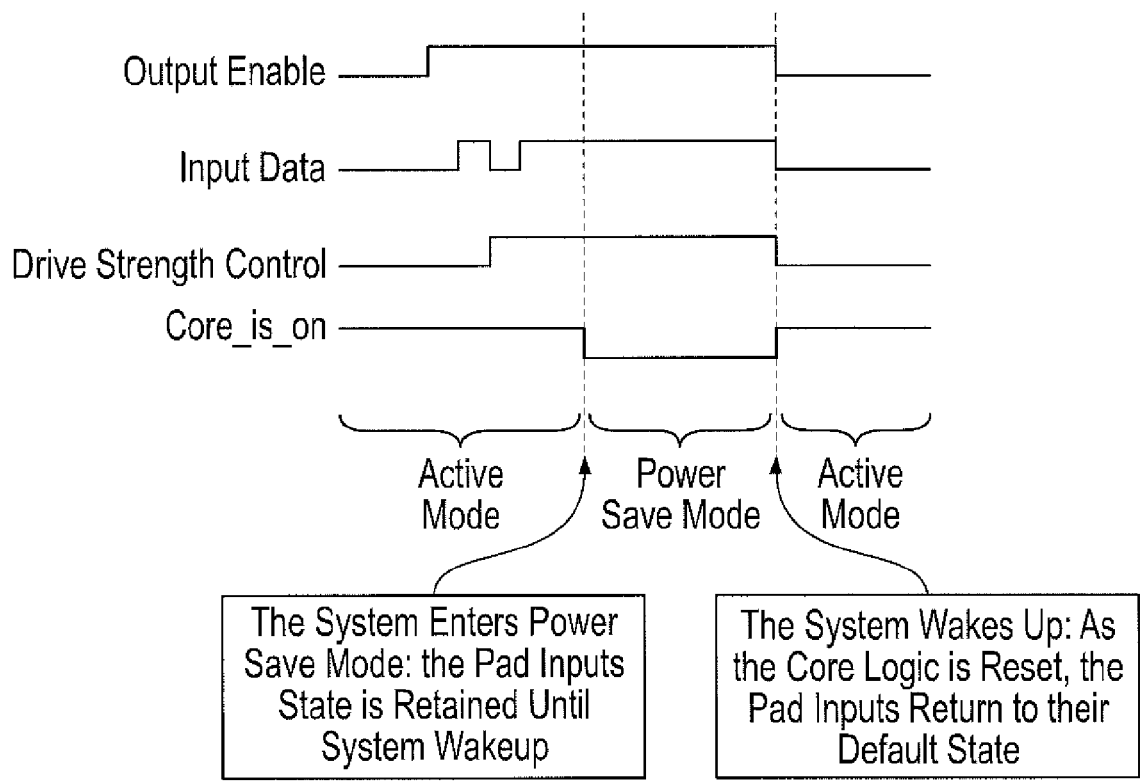
FIG. 4 is a timing diagram associated with automated control of the pad state retention function.

Further details of automated control of the pad state retention function are illustrated in FIGS. 3 and 4. As explained above with respect to FIG. 3, when microcontroller 10 enters the power saving mode, power state management unit 16 drives a logical one ("1") on line 26, which causes the "Core_is_on" signal at the output of NOR gate 22 to drop from a logical high to a logical low value (see FIG. 4). With the "Core_is_on" signal at a logical low value, the control signals indicative of the state of each I/O pad 12 (i.e., "Input data," Output enable" and "Drive strength control") are retained by a respective set of latches 32, 34, 36 and are used by control logic 30 to maintain the state of the corresponding I/O pad 12. Thus, during the low-power mode of operation, the respective states of the I/O pads 12 are retained.

Microcontroller 10 can be caused to wake up and return to the active mode, for example, when an internal counter reaches a predetermined count or by a reset signal. Power state management unit 16 then releases the "Core_is_on" signal (i.e., by driving a logical zero ("0") on line 26), and control of the input signals (i.e., "Input data," Output enable" and "Drive strength control") returns to I/O controller 18. As a result, the input signals (i.e., "Input data," Output enable" and "Drive strength control") would return, for example, to their default states.

Figure 5:
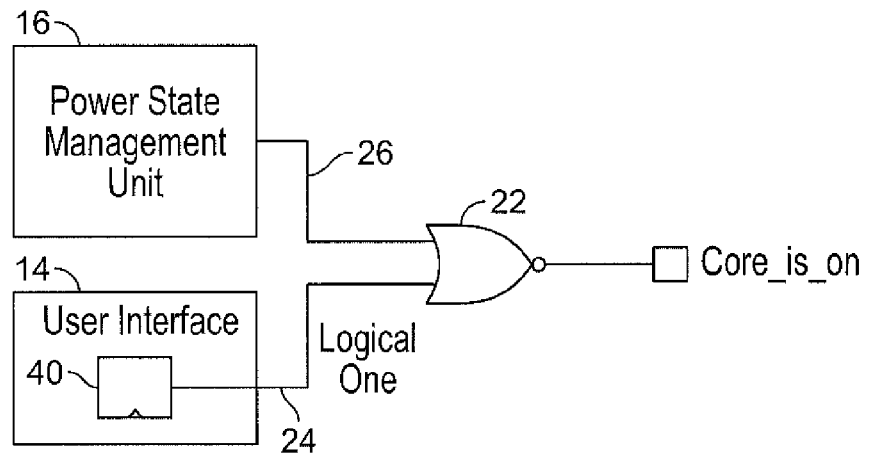
FIG. 5 illustrates portions of the logic for user control of the pad state retention function.
Figure 6:
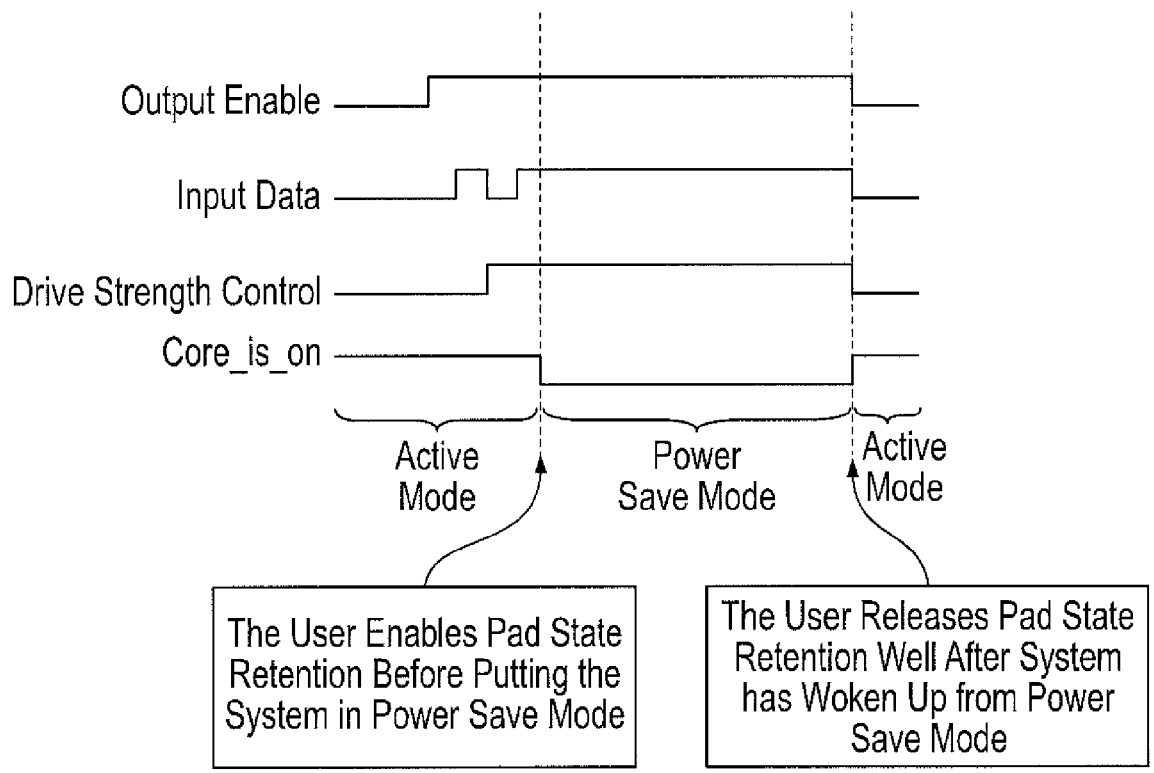
FIG. 6 is a timing diagram associated with user control of the pad state retention function.

Further details of the user-controlled, programmable mode of operation for the pad state retention function are illustrated in FIGS. 5 and 6. As explained above, the user can enable the pad retention function by writing a logical one ("1") to pad retention enable register 40 (see FIG. 5). Writing a logical one ("1") to pad retention enable register 40 overrides the signal from power state management unit 16 on line 26 and causes the "Core_is_on" signal at the output of NOR gate 22 to drop to a logical low value. With the "Core_is_on" signal at a logical low value, the states of the input control signals (i.e., "Input data," Output enable" and "Drive strength control") are retained by a respective set of latches 32, 34, 36. As shown in FIG. 6, this should be done before placing microcontroller 10 into the power save mode so that the control signals for retaining the states of I/O pads 12 are latched before microcontroller 10 enters the low-power mode. After microcontroller 10 wakes up and returns to the active mode, the user can release the pad state retention function by writing a logical zero ("0") to pad retention enable register 40. As the release occurs in this case through software, a small delay may be introduced. Such a small delay can be advantageous. For example, upon waking up, the pad retention preferably should be released through software control only after I/O controller 18 is properly configured (e.g., to ensure that "Input data," Output enable" and "Drive strength control" signals are the same as they were prior to entering the low-power mode). Such operation can help ensure that I/O pads 12 have the same value during the entire I/O pad sequence (e.g., active mode>>>shutdown mode>>>active mode).

In some implementations, it may be desirable to include isolation cells, such as logical AND gates, between the core logic (i.e., I/O controller 18) and I/O connector state control logic 20. Providing such isolation cells can help ensure that signals from the powered-down domain do not propagate to and from the pad logic interface.

Other implementations are within the scope of the claims.

What is claimed is:

1. A microcontroller operable in a low-power mode, the microcontroller comprising:
   one or more I/O connectors;
   an I/O controller operable to provide control signals for controlling a state of a particular one of the I/O connectors, wherein the I/O controller is powered off or deactivated during the low-power mode; and
   I/O connector state control logic operable to control the state of the particular one of the I/O connectors in accordance with the control signals from the I/O controller, wherein the I/O connector state control logic includes I/O connector state retention logic that retains states of the control signals and maintains the particular I/O connector in a corresponding state in accordance with the retained control signals while the microcontroller is in the low-power mode.

2. The microcontroller of claim 1 wherein the I/O connector state retention logic includes a plurality of latches each of which is operable to be enabled to latch a respective one of the control signals from the I/O controller.

3. The microcontroller of claim 2 further including a power state manager that provides a signal to cause the latches to latch the respective control signals when the microprocessor enters the low-power mode.

4. The microcontroller of claim 3 wherein, when the microprocessor exits the low-power mode, the power state manager releases the signal that caused the latches to latch the respective control signals.

5. The microcontroller of claim 1 wherein the control signals from the I/O controller include one or more of: a first signal to drive a logical one or zero onto the particular I/O connector, a second signal to select whether the particular I/O connector is used as an input or an output, and a third signal that selects a drive strength setting.

6. The microcontroller of claim 1 wherein the control signals from the I/O controller collectively include: a first signal to drive a logical one or zero onto the particular I/O connector, a second signal to select whether the particular I/O connector is used as an input or an output, and a third signal that selects a drive strength setting.

7. The microcontroller of claim 1 wherein the I/O connectors are in the form of I/O pads or I/O pins.

8. A microcontroller operable in a low-power mode, the microcontroller comprising:
   one or more I/O connectors;
   an I/O controller operable to provide control signals for controlling a state of a particular one of the I/O connectors, wherein the I/O controller is powered off or deactivated during the low-power mode;
   I/O connector state control logic operable to control the state of the particular one of the I/O connectors in accordance with the control signals from the I/O controller, wherein the I/O connector state control logic includes I/O connector state retention logic that retains respective states of the control signals and maintains the particular I/O connector in a corresponding state in accordance with the retained control signals while the microcontroller is in the low-power mode, thereby executing an I/O connector state retention function;
   a power state manager; and
   a user interface that, depending on a value stored in a register of the user interface, allows either automated I/O connector state retention by the power state manager or user-controlled I/O connector state retention.

9. The microcontroller of claim 8 wherein, if a first value is stored in the register, the user interface allows the power state manager to initiate execution of the I/O connector state retention function automatically when the microprocessor enters the low-power mode, and allows release of the I/O connector state retention function automatically when the microprocessor exits the low-power mode.

10. The microcontroller of claim 9 wherein the user interface allows execution of the I/O connector state retention function prior to the microprocessor entering the low-power mode at a time specified by user input, if a second value is stored in the register.

11. The microcontroller of claim 10 wherein the user interface allows release of the I/O connector state retention function after the microprocessor exits the low-power mode at a time specified by user input, if the second value is stored in the register.

12. The microcontroller of claim 8 wherein the I/O connector state retention logic includes a plurality of latches each of which is operable to be enabled to latch a respective one of the control signals from the I/O controller.

13. The microcontroller of claim 12 wherein the power state manager provides a signal to cause the latches to latch the respective control signals when the microprocessor enters the low-power mode.

14. The microcontroller of claim 13 wherein, when the microprocessor exits the low-power mode, the power state manager releases the signal that caused the latches to latch the respective control signals.

15. The microcontroller of claim 8 wherein the control signals from the I/O controller include: a first signal to drive a logical one or zero onto the particular I/O connector, a second signal to select whether the particular I/O connector is used as an input or an output, and a third signal that selects a drive strength setting.

16. A method of retaining the state of an I/O connector of a microcontroller, the method comprising:
   generating, from an I/O controller in the microcontroller, one or more control signals for controlling a state of the I/O connector;
   causing the microcontroller to enter a low-power mode of operation, in which the I/O controller is powered off or deactivated;

storing information indicative of the respective states of the one or more control signals prior to the I/O controller becoming powered off or deactivated; and maintaining the I/O connector in a corresponding state in accordance with the stored information while the microcontroller is in the low-power mode.

17. The method of claim 16 wherein storing information indicative of the respective states of the one or more control signals includes latching each of the respective control signals when the microcontroller enters the low-power mode.

18. The method of claim 17 including returning control of the one or more control signals to the I/O controller automatically when the microcontroller exits the low-power mode.

19. The method of claim 17 further including releasing latching of the one or more control signals automatically when the microcontroller exits the low-power mode.

20. The method of claim 16 wherein the one or more control signals include one or more of: a first signal to drive a logical one or zero onto the particular I/O connector, a second signal to select whether the particular I/O connector is used as an input or an output, and a third signal that selects a drive strength setting.

* * * * *